United States Patent [19]

Turudic et al.

[11] Patent Number: 5,157,656
[45] Date of Patent: Oct. 20, 1992

[54] NYBLET TIME SWITCH

[75] Inventors: Andy Turudic, Hillsborough; Mark G. Schnell, Durham, both of N.C.

[73] Assignee: Northern Telecom Limited, Montreal, Canada

[21] Appl. No.: 559,956

[22] Filed: Jul. 31, 1990

[51] Int. Cl.[5] .......................... H04J 3/22; H04Q 11/08
[52] U.S. Cl. .......................... 370/84; 370/66; 370/68
[58] Field of Search ............... 370/84, 99, 110.1, 112, 370/83, 68, 68.1, 58.1, 60, 118, 58.2, 66, 63, 64

[56] References Cited

U.S. PATENT DOCUMENTS

| | | | |
|---|---|---|---|
| 4,547,877 | 10/1985 | Lehman et al. | 370/84 |
| 4,953,180 | 8/1990 | Fieschi et al. | 370/110.1 |
| 4,965,787 | 10/1990 | Almond et al. | 370/58.1 |
| 4,972,407 | 11/1990 | Kawai | 370/99 |
| 4,985,891 | 1/1991 | Fujiwara et al. | 370/84 |

Primary Examiner—Douglas W. Olms
Assistant Examiner—H. Kizou
Attorney, Agent, or Firm—Foley & Lardner

[57] ABSTRACT

A data transmission method and apparatus provides for transmitting lower data rate information in a higher data transmission rate environment. Information entities to be transmitted are broken into smaller entitles called nyblets. Higher data transmission rates are accomodated by accelerating a clock and clocking nyblets from memory at rate that allows the nyblets to be serially assembled into expected bit length words. Lower data rate information, which in conventional systems was transmitted redundantly to achieve compatibility with higher data rate systems, is now transmitted without duplication as a plurality of nyblets in series until the expected bit length is achieved. The result is that more information can be transmitted over a communication medium, since duplicate or redundant transmission of lower data rate information is avoided.

10 Claims, 9 Drawing Sheets

CHANNELIZED FRAME
e.g. 1000 CHANNELS

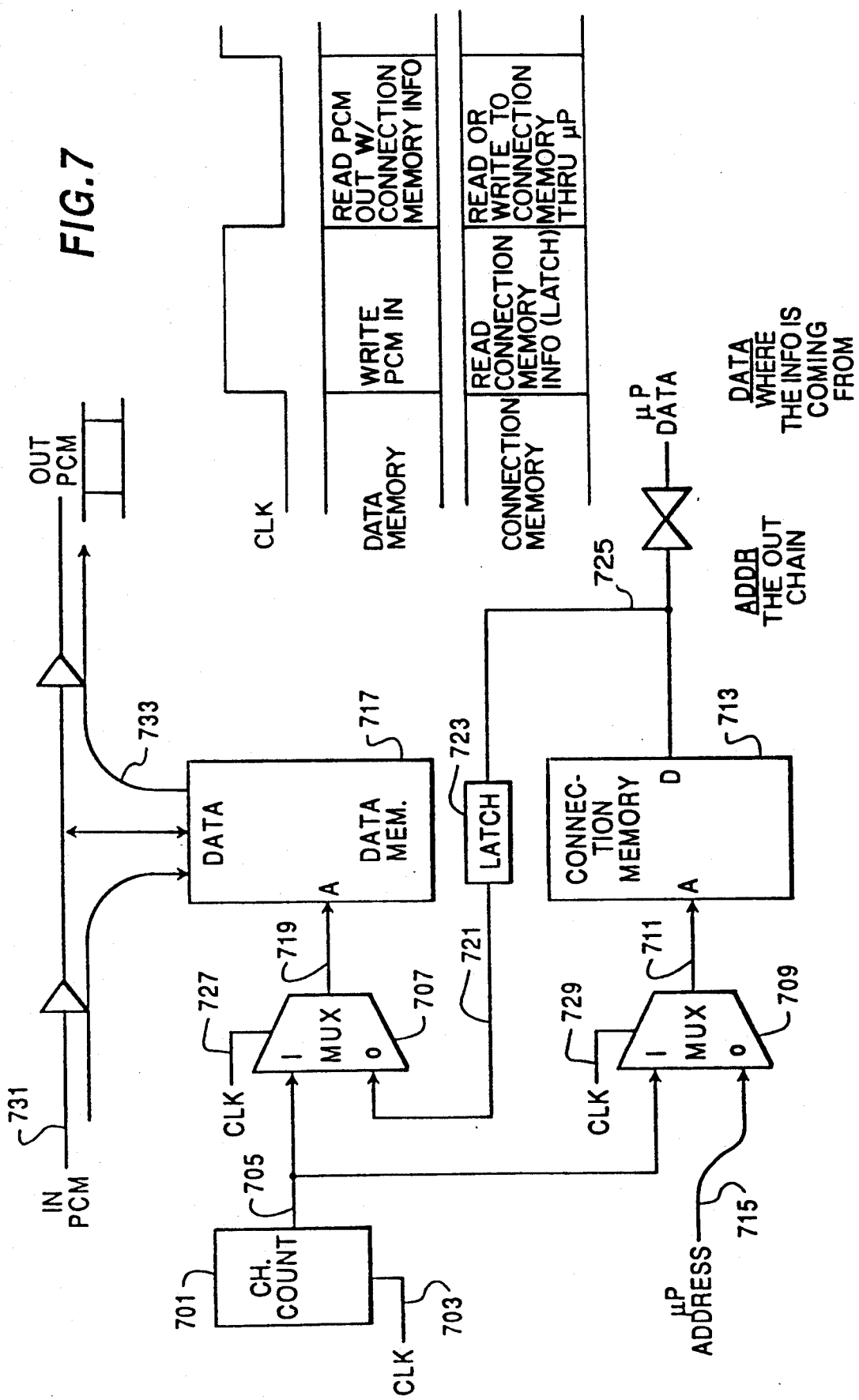

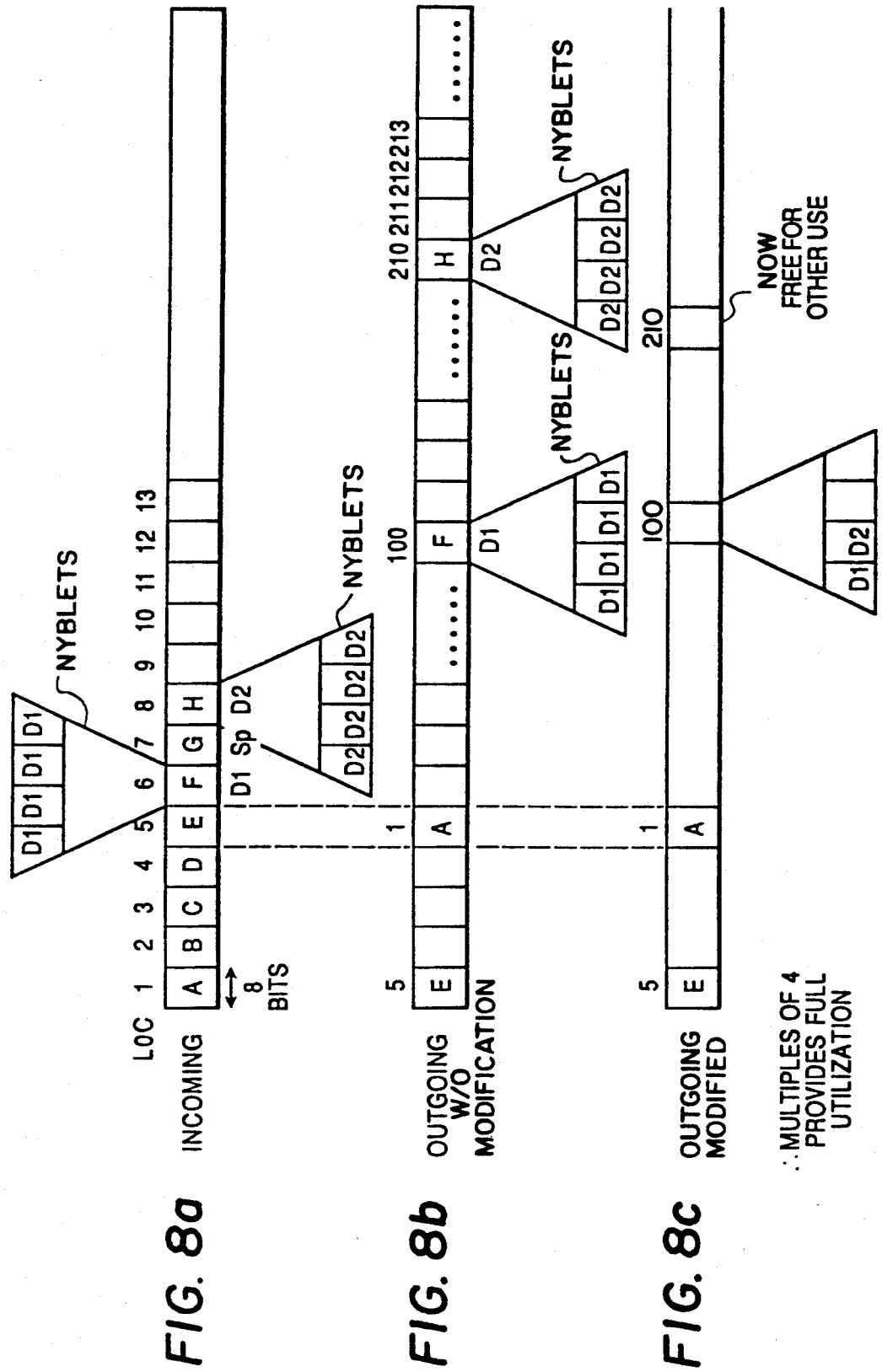

NYBLET TIME SWITCH

BACKGROUND OF THE INVENTION

1. Field of the Invention

The invention relates to information time switching. Specifically, the invention deals with multiplexing and demultiplexing telephone data with sub-rate capabilities.

2. Related Art

In North America, T1 carrier facilities operate by multiplexing speech information in the form of 8-bit words onto a data stream containing up to 24 different communicating parties. The 8-bit information is provided at 8 kilohertz (KHz) resulting in a 64 kilobyte per second channel. Since the information is provided at 8 KHz a sample period is 125 $\mu$S. In order to accommodate 24 communicating parties in a 125 $\mu$S frame, the carrier facilities must be clocked to accommodate 24 8-bit words or 192 bits per frame. Allowing another bit for framing, the T1 carrier facility clock 193 bits in a 125 $\mu$S frame, resulting in a clock rate of 1.544 megahertz (MHz).

Treatment of information at central office switches must accommodate the standard T1 carrier facilities. Since a single T1 carrier facility can accommodate 24 communicators on 64 kilobyte per second channels, the number of T1 channels between switches is a function of the local demand or the number of communicators which the switches must accommodate. The introduction of integrated systems digital networks (ISDN) capabilities has also affected the number of telephone sets which can be accommodated by central office switches. An ISDN set includes two bearer channels, also known as B channels, and one delta channel, also known as a D channel. The two B channels can carry any information desired and operate at 64 kilobits per second. The single D channel carries loop supervision information and operates at only 16 kilobits per second. Using a 192 kilobits per second link between the ISDN phone and a corresponding linecard at a switching office, the two B channels, the D channel and overhead information is transmitted. Since B channel information is transmitted at 64 kilobits per second, multiplexing devices in the central office switch have been configured to process information in 64 kilobits per second increments. As a result, T1 carrier facilities are taxed because each ISDN information set consumes two 64 kilobits channels for B channel information and a third 64 kilobits per second channel for the D channel information, even though this information requires only 16 kilobits per second. As a result, a single T1 carrier facility dedicated to ISDN devices conventionally only accommodates one-third the number of communicators, or eight ISDN information sets. The consumption of a 64 kilobit per second channel to accommodate 16 kilobit per second D channel information is an unfortunate consequence of the ISDN channel configuration used with T1 carrier facilities. The unused capacity reduces economic efficiency by reducing the number of information sets which can be accommodated.

SUMMARY AND OBJECTS OF THE INVENTION

In view of the above limitations of the related art, it is an object of the invention to more efficiently switch and transport ISDN D-channel information.

It is a further object of the invention to switch the D-channel information by consuming only ¼ of a channel, thereby allowing at least 10 ISDN information sets to be transmitted on a T1 carrier facility.

It is still another object of the invention to switch the 16 kilobits per second ISDN D-channels by pulling them into a 64 kilobits per second entity.

It is still another objection of the invention to sequentially provide D1, D2, D3 and D4 information in a 64 kilobits per second channel, such that each of the D channels operating at 16 kilobits per second are accommodated on the 64 kilobits per second channel.

It is still a further object of the invention to provide a connection memory which automatically routes the sequential D channel information when a D channel transmission takes place.

It is a further object of the invention to treat D channel information and 64 kilobits per second speech information in the same way in data memory.

It is still another object of the invention to access speech and data information through a connection memory organized into entities which have a number of bits equal to the number of bits in a word divided by an integer, where the integer is a quotient of the maximum data transmission rate divided by the lowest data transmission rate of the channels and in which the entities are known as nyblets.

It is a further object of the invention to store and access information as individual nyblets.

It is a further object of the invention to store in connection memory a group of pointers with each pointer identifying a location in data memory where the corresponding nyblet is stored.

The above and other objects of the invention are accomplished by a nyblet time switch which multiplexes information transmitted on 64 kilobits per second channels with D channel information. According to the invention, 8-bit words, which are transmitted at eight kilohertz to form a 64 kilobits per second channel, are accessed once each 125 $\mu$S time frame. Each 8-bit word is accessed in 2-bit nyblets. Four nyblets put together in sequence form a single word. Thus, 8-bit words and 64 kilobit per second speech channels are formed simply by stringing four 2-bit nyblets together. Unlike previous approaches in which 2-bit D channel information was duplicated so that it would be transmitted four times to accommodate the 64 kilobit per second channel, according to the present invention a pointer and a connection memory transmits the information on the 64 kilobit per second channel as a series of 2-bit nyblets with each nyblet corresponding to a different D channel. Thus, rather than transmitting D1-D1-D1-D1, the system transmits D1-D2-D3-D4. As a result, the information for each D channel consumes only ¼ of a 64 kilobit per second channel. This leaves room for an addition two channels of 64 kilobit per second channel information on a T1 carrier facility. As a result, the economic efficiency of the system is improved.

BRIEF DESCRIPTION OF THE DRAWINGS

The invention will be described in more detail below with reference to specific items in the figures in which:

FIG. 7 illustrates one configuration of connecting the data in connection memory;

FIG. 8a, illustrates an incoming information pattern;

FIG. 8b, illustrates an outgoing information pattern using duplicated D Channel information;

FIG. 8c, illustrates an outgoing information pattern without redundant D Channel information.

DETAILED DESCRIPTION OF THE PREFERRED EMBODIMENTS

Figure 1:
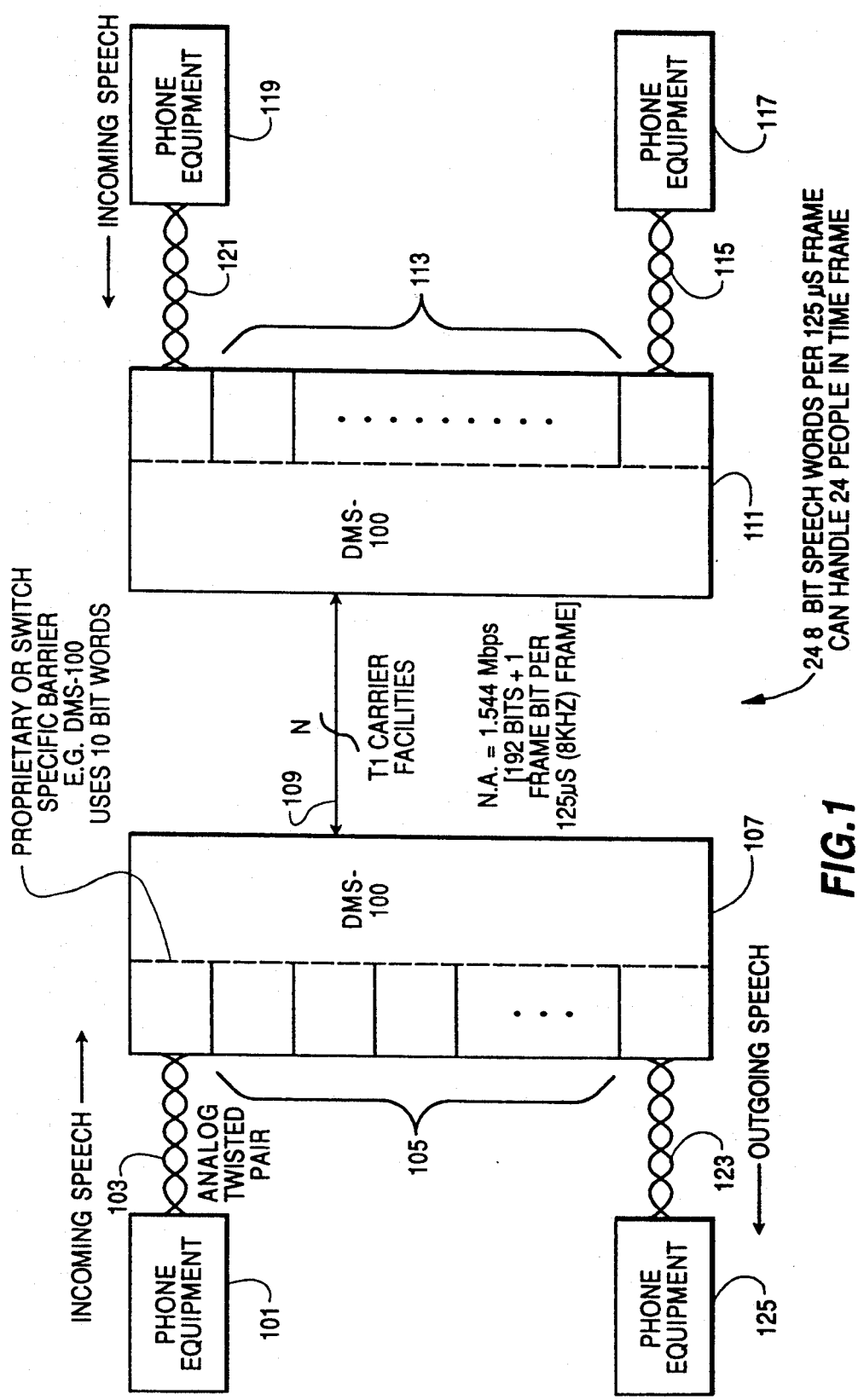
FIG. 1 illustrates interconnections at central office switches.
Figure 2:
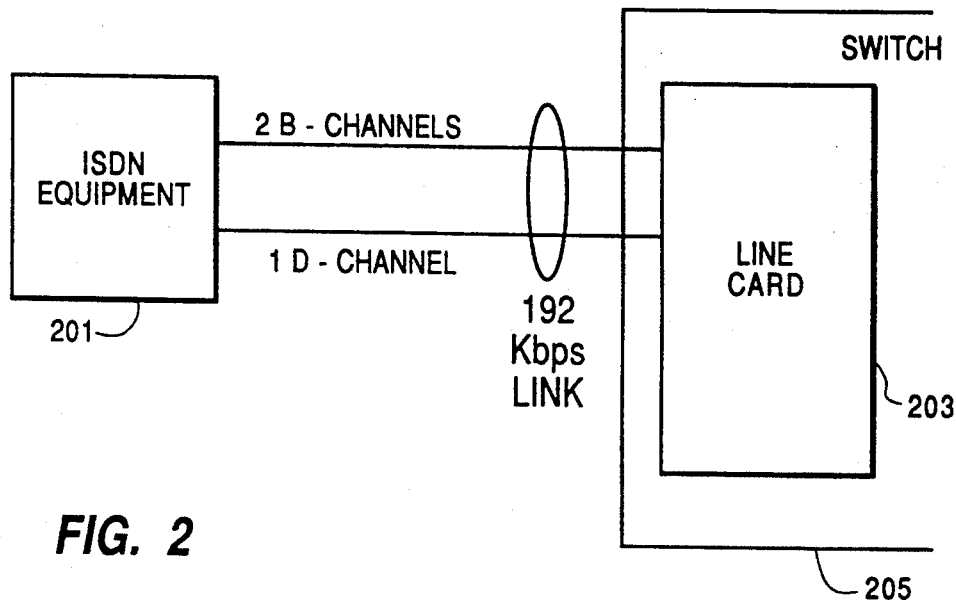
FIG. 2 illustrates channel connections of an ISDN set to a linecard at a central office switch.

As shown in FIG. 1, incoming speech from telephone equipment 101 is transmitted over analog twisted pair lines 103 to one of a plurality of linecards 105 which form a proprietary or switch specific barrier at central office 107. One known such switch specific barrier is a DMS-100. After processing the information in the switch specific barrier at central office 107, the speech can be routed over T1 carrier facilities to another central office 111 where another switch specific barrier having linecards 113 can then route the speech from phone equipment 101 over analog switched pair 115 to a receiving phone equipment 117. As previously discussed, in North America T1 carrier facilities 109 are operated at 1.544 MBPS in which 24 8-bit speech words are transmitted in a single 125 μS frame. Thus, 192 information bits are transmitted at 8 kilohertz in the 125 μS frame. In addition, a framing bit is also included in the 125 μS frame, thus resulting in 193 bits being transmitted in a 125 μS frame. It should be noted that the invention is not limited to North American T1 carrier facilities but can be applied to other carrier facilities using other data rates and formats employed throughout the world. It should also be noted that, as shown in FIG. 1, incoming speech may originate at another end of the system, such as phone equipment 119, so that it is transmitted over analog lines 121 through linecards 113 and carrier facilities 109 to central office 107. Here this speech information could then be routed by linecards 105 over analog lines 123 to telephone equipment 125.

The emergence of the integrated services digital network (ISDN) as an important telecommunication means has resulted in ISDN equipment 201 being connected to linecards, e.g. 203 in central office 205 over a 192 Kbps link in which two B channels and one D channel are connected to each linecard. There are three channels operating on the 192 Kbps link. Each of the two B channels operates at 64 Kbps, the D channel has a 16 Kbps capability.

Figure 3:
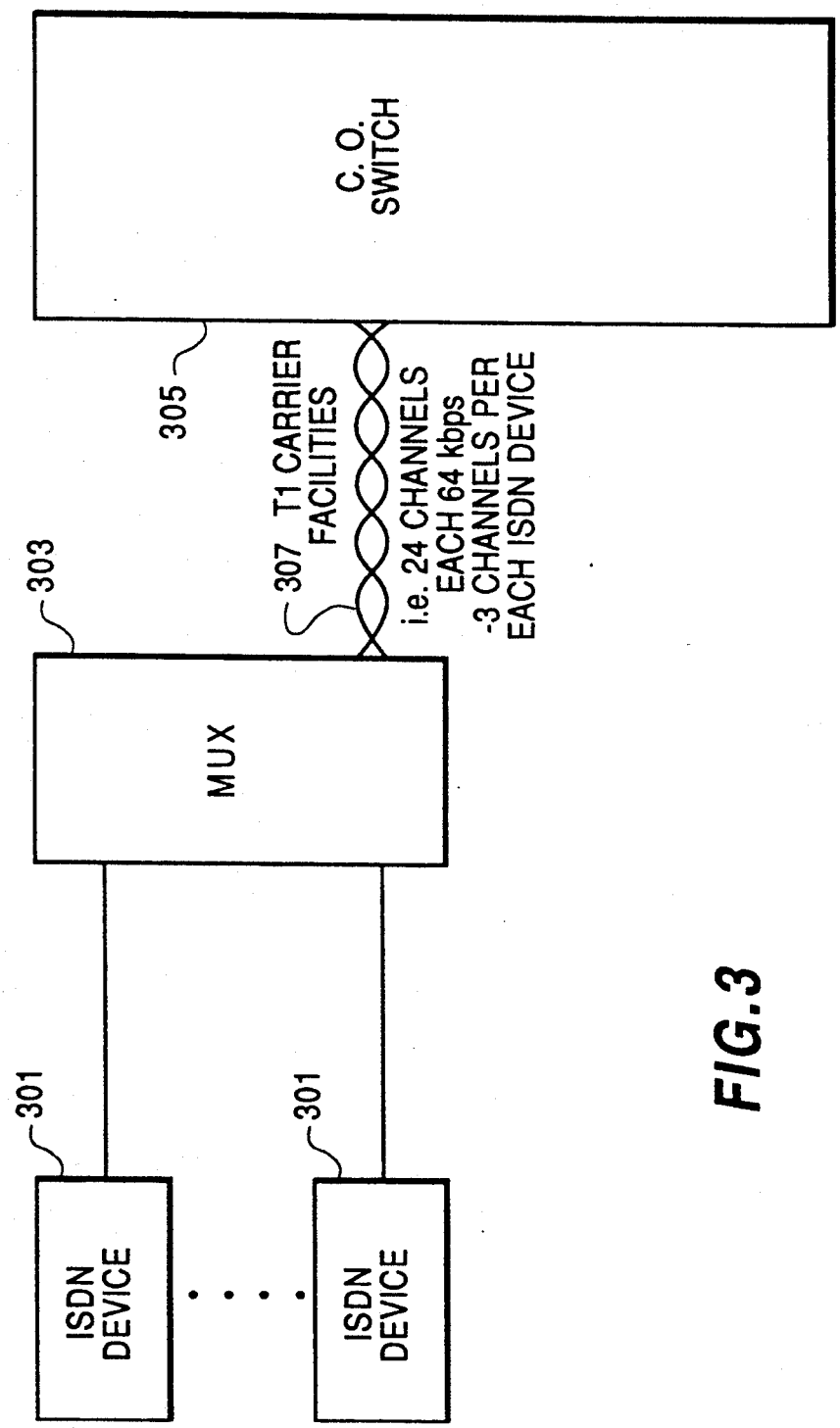
FIG. 3 illustrates multiplexing ISDN signals and transmission over T1 carrier facilities to a central office switch.

In addition, as previously discussed, a T1 transmission line operates at 1.544 MBPS. This accommodates 24 8-bit speech words per 125 μS frame so that 24 pieces of standard phone equipment can be multiplexed on a single T1 carrier facility. However, each ISDN equipment conventionally occupies three 64 Kbps channels resulting in a 192 Kbps band width. This allows only eight ISDN devices to be accommodated by a single T1 carrier facility. This is illustrated in FIG. 3 which shows that ISDN devices 301 can be connected to multiplexer 303 and transmitted to a central office switch 305 over T1 carrier facilities 307. The T1 carrier facilities 307 can accommodate 24 64 Kbps channels. Since each ISDN device conventionally requires three channels, eight ISDN devices can be accommodated on the T1 carrier facility 307 communicating with central office switch 305.

Figure 4:
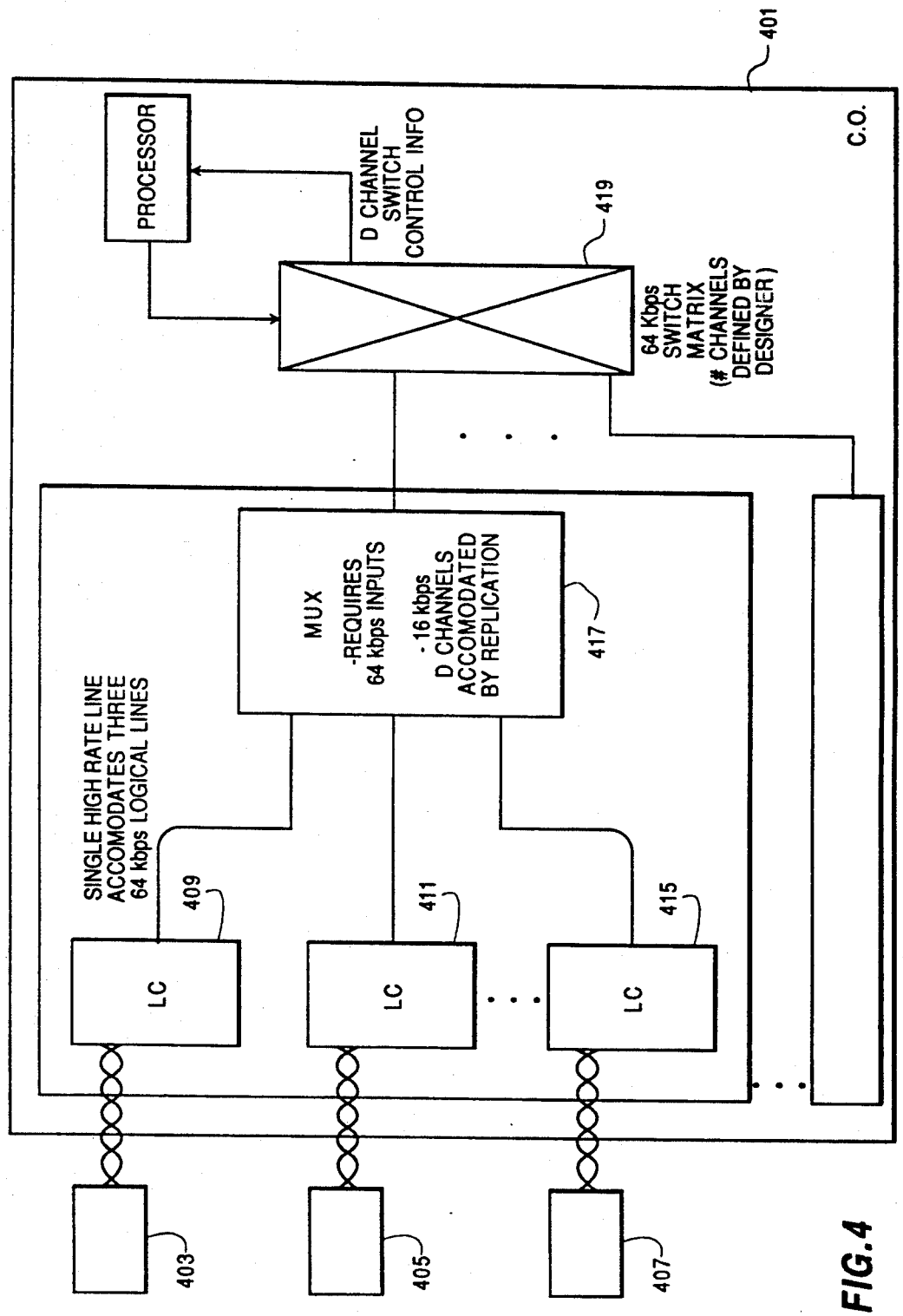
FIG. 4 illustrates in more detail ISDN connections at a central office switch.

FIG. 4 shows a configuration in a central office 401 in which multiplexer 417 receives information from linecards 409, 411, and 415 which are connected to telephone equipment 403, 405 and 407, respectively. Multiplexer 417 receives information from the linecards and formats it for transmission to the 64 Kbps switch matrix 419. The 64 Kbps switch matrix 419 is designed to accommodate the number of channels desired by the designer. Since information must be provided to switch matrix 419 in the 64 Kbps format, multiplexer 417 must operate to provide the 16 Kbps D channel ISDN information in the same 64 Kbps format. This presents no problem for the two ISDN B channels. However, since the D channels operate at 16 Kbps transmitting information in the 64 Kbps format requires duplicating the D channel information so that the same information is transmitted four times. This wastes capacity and is obviously undesirable.

Figure 6:
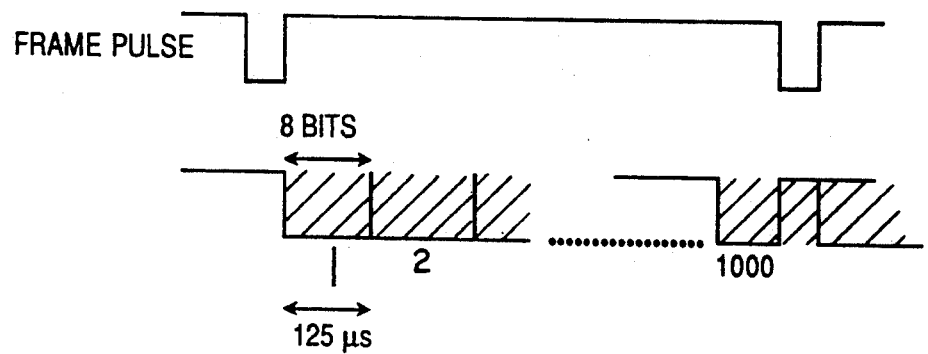
FIG. 6 illustrates a channelized frame pulse.
Figure 5:
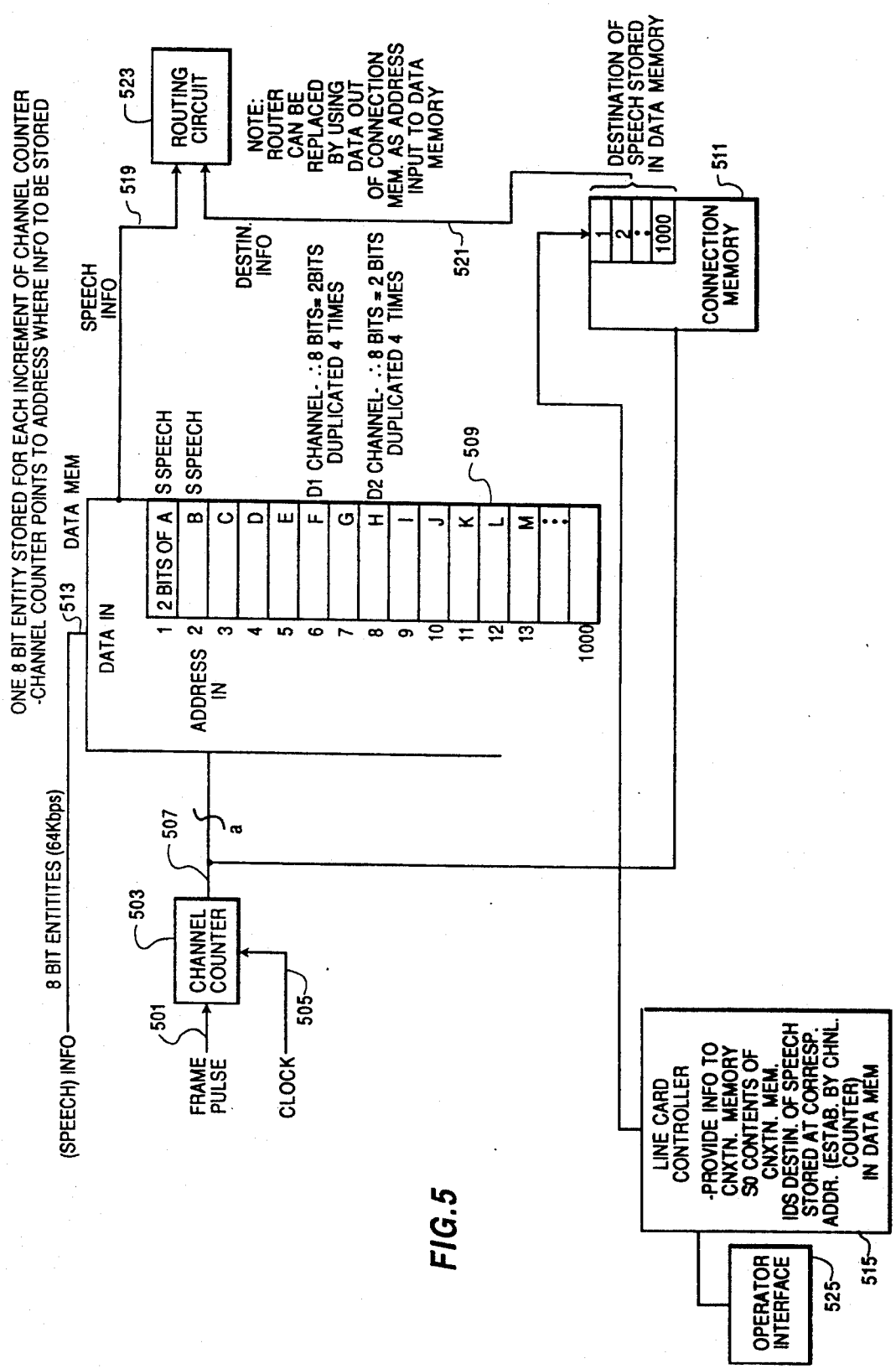
FIG. 5 illustrates the functions performed in the first and second half cycles of information processing.

FIG. 5 illustrates a switch matrix 419 designed to switch 1,000 channels. A frame pulse on signal line 501 activates channel counter 503 whose output on signal line 507 is incremented in response to a clock 505. Each incremented output of the channel counter on output line 507 provides an address code to data memory 509 and connection memory 511. FIG. 6 illustrates how a 125 μS frame is channelized into one thousand 125 nanosecond channels. Eight-bit entities are transmitted in each 125 nanosecond time increment. Thus, speech information received as 8-bit entities on line 513 is sequentially clocked into the data memory so that one 8-bit entity is stored for each increment of the channel counter. For the data memory 509, output signal on line 507 from the channel counter 503 points to the address where the received information 513 is to be stored. Linecard controller 515 provides information to connection memory 511 concerning the destination of the information, such as speech data and control information, stored in the data memory 509. Thus, each increment of the channel counter provides an address of the connection memory at which the destination of the information stored at the corresponding address in the data memory is identified. It should be noted that 8-bit entities of information can be stored in data memory 509 at sequential addresses for plain old telephone service (POTS) and for the B channels of ISDN devices. However, since the D channels of ISDN devices are transmitted at only 16 kilobits per second, which is ¼ the 64 KBps data rate of pulse code modulated speech information in line 513, only two bits are required for each D-channel. In order to conform to the 64 Kbps format, the D channel information is therefore duplicated so that eight bits of information are transmitted on the channel.

During the first half cycle of a clock, incoming speech on signal line 513 is placed in memory. During the second half cycle of a clock, the connection memory is accessed to identify the destination of the information stored in the data memory at the address defined by the channel counter. For example, speech information can be transmitted over data output line 519 while destination information is transmitted over line 521 to routing circuit 523.

It should be noted that the routing circuit 523 can be replaced by using the data output of the connection memory as an address input to the data memory. FIG. 7 illustrates how this can be accomplished. In this configuration, channel counter 701 clocked by clock 703 produces outputs on line 705 which are provided to multiplexers 707 and 709. Multiplexer 709 provides address information on line 711 to connection memory 713. This information can be the output from the channel counter 705 or a microprocessor address on line 715 which is provided by a linecard controller, e.g. 515, used to program the routing information into the connection memory. It should be noted that linecard controller 515 is used to completely define in the connection memory the routing information for each channel.

Data memory 717 receives its address information from the output of multiplexer 707 on line 719. Line 719 contains either the channel counter output on line 705 or latched connection memory information on line 721. Line 721 is defined by the output of latch 723 which is connected to the data output 725 of connection memory 713. The output of multiplexers 707 and 709 depends on the status of clocks 727 and 729.

During the first half clock cycle, input pulse code modulated (PCM) information or speech information received on signal line 731 is transmitted through data line 733 and read into data memory 717. This is accomplished by activating multiplexer 707 to put the channel count on line 705 as the address on signal 719 of the data memory. The speech or pulse code modulated information is then read into the data memory 717. In addition, signal line 711 is also clocked so that the address on connection memory 713 corresponds to the output of channel counter 701 on signal lines 705. Thus, during the first half clock cycle the connection memory data output, which defines the destination of the speech at the address location on line 711 is latched into latch 723. During the second half clock cycle, address line 719 is then switched via clock 727 so that multiplexer 707 provides the information on signal line 721 to the address input of the data memory 717. As a result, during the second half of the clock cycle pulse code modulated information is transmitted on data line 733 from the address defined by connection memory 713 to the channel corresponding to the channel counter value.

FIG. 8a illustrates a series of incoming 8-bit entities which are sequentially provided from each of the linecards. The location of each entity is determined by the sequential nature of channel counter 503. Thus, 8-bit entity A is placed into memory in the first sequential location, the second 8-bit entity B is placed into the second sequential location, and so on. This occurs for each of the channels in a 125 μS frame. As shown in FIG. 8a, entities A-E and G are 8-bit pulse code modulated speech. Entity F represents the D channel information from the first ISDN device defined by an operator to linecard controller 515. It should be noted that operator interface 525 provides an individual operator a means for defining to linecard controller 515 the nature of each of the linecards operating at a particular switching station. Thus, in the example shown in FIGS. 8a-9c channels A, B, and C could be accommodating plain old telephone service (POTS) while channels D and E represent B channels for the first ISDN device. Channel F represents the D channel information for the first ISDN device. As previously discussed, the D channels of ISDN devices operate at 16 Kbps while the remaining channels operate at 64 Kbps. The switching device, such as 64 Kbps switch 419, requires a consistent format. Since the D channels operate at only ¼ the data rate of the other channels, and since each channel is 8 bits, only 2 bits are required to transmit the D channel information, which typically control information for the ISDN device. However, in order to maintain a consistent 64 Kbps format, the two D channel bits are duplicated so that 8 bits are stored in the data memory. The 8 bits are then transmitted in accordance with the information programmed into the connection memory, e.g. 511 or 713, so that the 8 bits are transmitted through the switch matrix. This is shown in FIG. 8b where channel F, which is stored at location 6, contains D channel information for the first ISDN device, the D1 channel. Data stream H stored at location 8 contains D channel information for the second ISDN device, the D2 channel. FIG. 8b shows that the D1 information is routed to location 100 while the D2 information is routed to location 210. In this example of a conventional system all 8 bits would then be transmitted in order to be routed to the appropriate location. Thus, to accommodate the D1 and D2 channels, 16 bits are transmitted, even though 12 of the transmitted bits merely duplicate the basic information required. Only four of the 16 bits actually need to be transmitted to provide the proper control to the first and second ISDN devices. This principle is true for any number of ISDN devices and as the number of ISDN channels in a frame increases, the penalty for transmitting redundant information also increases.

FIG. 8c illustrates one way in which the outgoing information can be packed to avoid the transmission of redundant information. FIG. 8c shows that when the first ISDN D channel is encountered, D channel information for additional ISDN devices which can be accommodated by the number of bits in the channel is also transmitted. Thus, in the example shown in FIG. 8, the 2 bits required for transmitting D1 channel information are followed by transmitting 2 bits for the D2 channel information. Because 8 bits can be transmitted in a channel, this approach could be extended to D3 and D4 channels, as required and remain transparent to other devices in the system. Additional ISDN devices, e.g. D-channels D5-D8, could be accommodated as another eight bit entity formed by string the 8 bit D channel information together in sequence. In cases where 8 bits are not required, e.g. only two ISDN channels to be transmitted, the "left over" bits can be ignored.

Since the D1 and D2 channel information has been transmitted when the address counter is at location 100, 2 bits of D1 channel information and 2 bits of D2 channel information are transmitted. As previously noted, if 2 bits of D3 information and 2 bits of D4 information were available, these would also be transmitted so that a maximum of an 8 bit entity would be transmitted at one time. The advantage to transmitting the D channel control information in this fashion is that the information is required only once per frame. Thus, when channel counter 513 increments to location 210, the D2 channel information need not be transmitted. Location 210 instead becomes available to accommodate an additional pulse code modulated information channel. As a result, the information carrying capacity of the system is increased without necessitating construction of additional transmission capability. For example, as previously discussed, a T1 carrier facility accommodates 24 64 Kbps channels with each channel transmitting 8-bit information entities at 8 kilohertz. When ISDN devices are involved, only 8 devices are available, since each ISDN device consumes three channels. By eliminating the transmission of redundant information, additional channels become available so that a single T1 carrier facility can handle up to ten ISDN devices.

As discussed above, efficiency can be achieved by viewing the information transmitted on the system as individual entities whose bit length is equal to the smallest number of bits which are required for fundamental control of the devices on the system. Each of these entities is called nyblet. In the above case, 2 bits are needed to provide D channel control information. This is because information transmitted on the D channels is at 16 Kbps and is only one-fourth the information rate of the transmission channel which is 64 Kbps. Thus, even though information is transmitted as 8-bit speech entities, only one-fourth of these 8 bits, i.e., or 2 bits, is required for D channel control information. Since the individual nyblet entity is now 2 bits, an 8-bit pulse code modulated speech entity is formed by a sequential series of four 2-bit nyblets. Thus, pulse code modulated speech information can be easily reconstructed in a manner transparent to external devices because four 2-bit information entities transmitted in sequence are no different to external devices from a single 8-bit entity. The efficiency is achieved in the transmission of control information on the ISDN D channels. This is because instead of transmitting duplicate information, such as D1-D1-D1-D1, D2-D2-,D2-D2, D3-D3-D3-D3, D4-D4-D4-D4, the information is now transmitted as D1-D2-D3-D4. Control information for four ISDN channels is transmitted in a manner compatible with a single 8-bit entity, rather than requiring four individual 8-bit entities. As previously discussed, this releases other channels for transmission of additional information.

Figure 9:
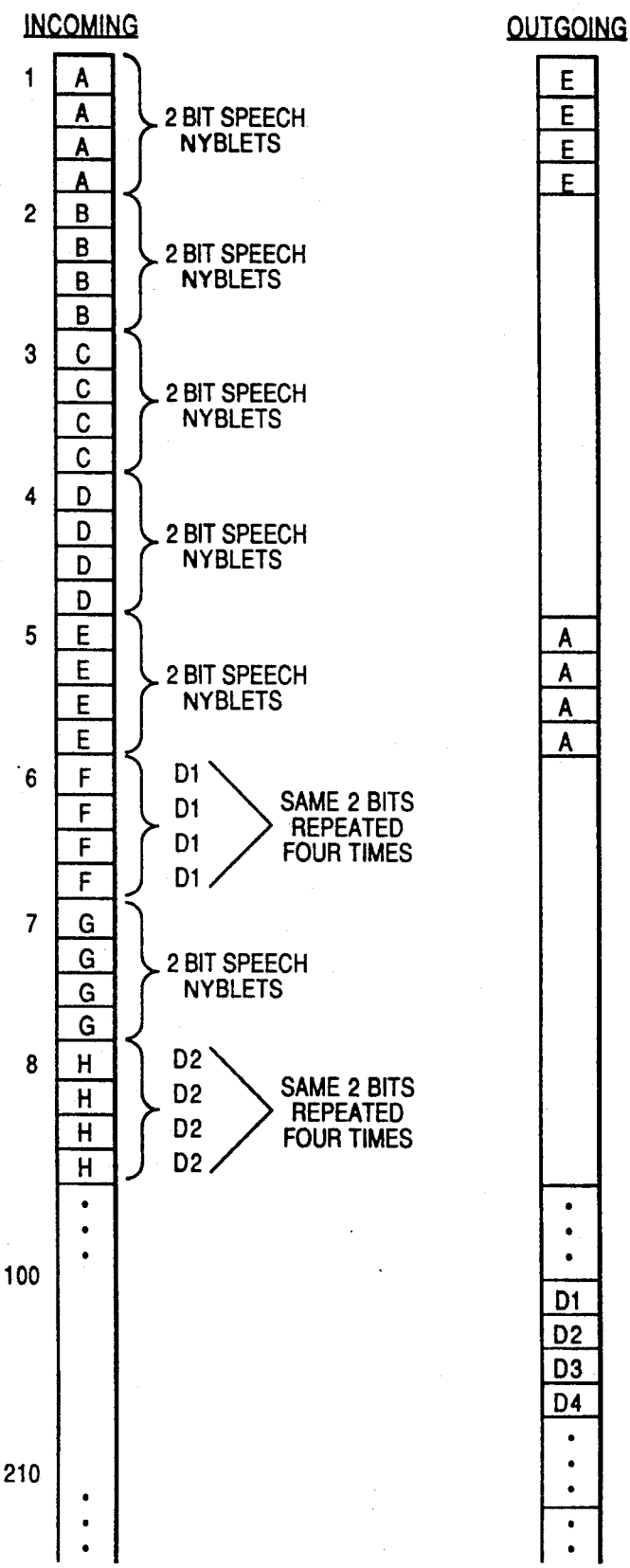
FIG. 9 illustrates a memory configuration using nyblets.

FIG. 9 illustrates how this can be accomplished. As previously discussed, the 1,000 channel connection memory required 1,000 address locations with each address location containing an 8-bit word. The 8-bit word could be either 8 bits of pulse code modulated speech or redundant D channel control information. As shown in FIG. 9, one approach is to replace this memory with another memory only 2 bits wide and having 4,000 locations. Using this approach, an 8-bit pulse code modulated entity can be created by stringing together four sequential 2-bit entities and transmitting them one after the other. Since two bit entities rather than 8 bit entities are now being switched, the clock rate for channel counter 503 must be accelerated by four times. However, to devices connected to the system the arrangement of the memory is transparent, since each device sees the correct information appear at the correct time as determined by a clock signal.

It should be noted that the information is stored in 2-bit entities blindly so that the data memory still contains duplicate or redundant copies of the D channel information for each of the ISDN devices. Thus, 8-bit speech information and D channel control information is stored in the same manner as in conventional systems, even though it is stored as 2-bit entities rather than 8-bit entities. The connection memory now provides routing information in a manner consistent with the alteration of the data memory. For example, the connection memory contains 4,000 2-bit entities to route incoming and outgoing speech from one linecard to another. In this case for a data transmission channel such as a POTS device or an ISDN B channel, the routing information in the connection memory is programmed such that four 2-bit entities are routed to the same channel. Thus, the bits are easily assembled into an 8-bit entity. For the D channel control information for ISDN devices, the first entry contains the address of the D1 information. The next entries in the connection memory contain the addresses of the D2, D3 and D4 information, respectively. This is possible because channels are defined by an operator through the operator interface 525 via the line card controller 515. As a result, at all times it is possible to determine which D channel information is to be transmitted and the location in the connection memory of the remaining D channel information by knowing the current count of channel counter 503.

Figure 10:
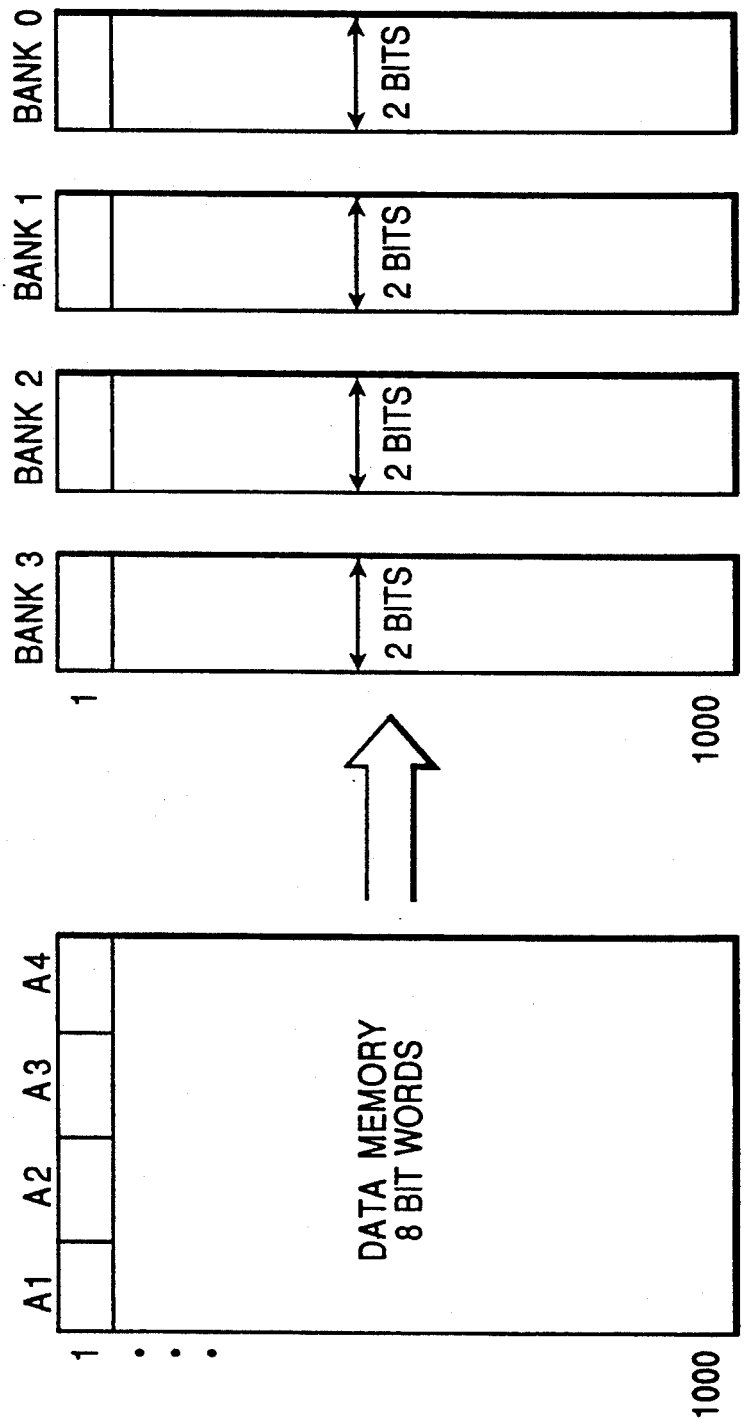
FIG. 10 illustrates a memory configured into data banks corresponding to nyblets.

FIG. 10 illustrates an alternative memory organization method in which the data memory is organized into individual 2-bit banks. Thus, for example, 1,000 channels of 8-bit data memory words can be stored as 1,000 entries of banks 0-3. By accessing each bank of the data memory for each count of the channel counter, it is possible to access the information as 2-bit nyblets while maintaining the same channel count as in conventional systems. The advantage of transmitting information in nyblets is that pulse code modulated information, such as speech, and D channel control information for ISDN devices can be transmitted in the same manner in a way that is transparent to the overall system. In addition, since the D channel information can be packed into 8-bit sequences, with each sequence having 2 bits corresponding to one of four ISDN D channels or four ISDN devices, it is possible to transmit 16 Kbps information in a 64 Kbps environment. This releases other information channels, thereby increasing the data transmission capacity of the overall system in taking full advantage of the capabilities of T1 carrier facilities.

It should be pointed out that the above invention has been described for ISDN devices in a 64 Kbps environment. However, nyblets of any particular length can be used to allow transmission of lower data rate information in a higher data rate environment by employing the same approach. Moreover, the above method and structure in terms of the organization of nyblets and data and connection memories is not restricted to telephone applications. The method and structure could be applied to any data communications requirement involving the transmission of lower data rate information of higher data rate channels.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of switching information among a plurality of incoming and outgoing information channels carrying multiple bit data words at different data transmission rates, the method comprising the steps of:

accessing from the incoming channels nyblets of the data words, each nyblet having a predetermined number of bits, the number of bits in a nyblet being less than a total number of bits in each word;

for incoming channels operating at a maximum transmission rate, storing in a data memory a first ordered sequence of nyblets of the data words from each incoming channel and sequentially transmitting the nyblets in the first ordered sequence to reform the data words on outgoing channels;

for incoming channels operating at transmission rates less than the maximum transmission rate, duplicating a first nyblet of each word n−1 times, where n is a quotient of the maximum transmission rate divided by a lowest transmission rate of the channels, and storing in a second ordered sequence in the data memory each nyblet and its duplications; and for incoming channels operating at transmission rates less than the maximum transmission rate, retrieving from the data memory the nyblets and transmitting the nyblets in a third ordered sequence on the outgoing channels, the third ordered sequence including only the first occurrence of each nyblet.

2. The method recited in claim 1 wherein the steps of storing the nyblets in the first and second ordered sequence comprises:

storing a plurality of nyblets from each incoming channel sequentially in the data memory, such that adjacently positioned nyblets of each incoming channel are stored in sequential memory locations.

3. The method recited in claim 2 wherein the data words on each incoming channel are stored sequentially in the memory, and wherein each incoming channel identifies a communicating device.

4. The method recited in claim 1 wherein the data words on the incoming channels have a fixed number of nyblets in identifiable positions within the data words, the method further comprising:

clocking the nyblets of the data words onto each outgoing channel such that the nyblets are placed on the outgoing channels in data words having nyblets in identifiable positions corresponding to the identifiable positions in the incoming data words in a predetermined sequence of channels.

5. The method recited in claim 1 wherein the channels operating at less than the maximum rate transmission rates are ISDN D channels.

6. The method recited in claim 1 wherein the third ordered sequence contains nyblets from a plurality of channels operating at the lower information transmission rate.

7. The method recited in claim 1 wherein a connection memory, in which each connection memory address corresponds to a particular destination nyblet of a data word of an outgoing channel, is addressed and the contents of the connection memory at an addressed location designates a particular nyblet of a data word on an incoming channel as the data to be transmitted to the particular nyblet of a data word of an outgoing channel.

8. A method of switching information among a plurality of incoming and outgoing information channels carrying multiple bit data words at different data transmission rates, the method comprising the steps of:

accessing from incoming channels nyblets of the data words, each nyblet having a predetermined number of bits, the number of bits in a nyblet being less than a total number of bits in each word;

for incoming channels operating at a maximum transmission rate, storing in a data memory a first ordered sequence of nyblets of the data words from each incoming channel and sequentially transmitting the nyblets to outgoing channels in the first ordered sequence to reform the data words;

for incoming channels operating at transmission rates less than the maximum transmission rate, storing in a second ordered sequence in the data memory a selected nyblet of each data word and a plurality of n−1 any other nyblets, where n is a quotient of the maximum transmission rate divided by a lowest transmission rate of the channels, for incoming channels operating at transmission rates less than the maximum transmission rate, retrieving from the data memory the nyblets and transmitting the nyblets to outgoing channels in a third ordered sequence, the third ordered sequence including only each selected nyblet.

9. An apparatus for switching information among a plurality of incoming and outgoing information channels carrying multiple bit data words at different data transmission rates, the apparatus comprising:

means for accessing from the incoming channels nyblets of the data words, each nyblet having a predetermined number of bits, the number of bits in a nyblet being less than a total number of bits in each word;

a data memory for storing a first ordered sequence of nyblets of the data words from each incoming channel operating at a maximum transmission rate and a second ordered sequence of nyblets from channels operating at less than the maximum data transmission rate;

means for sequentially transmitting the nyblets in the first ordered sequence to reform the data words on outgoing channels;

means for duplicating, in incoming channels operating at less than the maximum transmission rate, a first nyblet of each word n−1 times, where n is a quotient of the maximum transmission rate divided by a lowest transmission rate of the channels, and for storing in the second ordered sequence in the data memory each nyblet and its duplications; and for the incoming channels operating at less than the maximum transmission rate, means for retrieving from the data memory the nyblets and transmitting the nyblets in a third ordered sequence, the third ordered sequence including only the first occurrence of each nyblet.

10. An apparatus for switching information among a plurality of incoming and outgoing information channels carrying multiple bit data words at different data transmission rates, the apparatus comprising means for accessing from the incoming channels nyblets of the data words, each nyblet having a predetermined number of bits, the number of bits in a nyblet being less than a total number of bits in each word;

a data memory for storing a first ordered sequence of nyblets of the data words from each incoming channel operating at a maximum data transmission rate and a second ordered sequence of nyblets of data words for incoming channels operating at less than the maximum data transmission rate;

means for sequentially transmitting the nyblets in the first ordered sequence to reform the data words on outgoing channels, as the data words in the channels operating at the maximum data transmission rates are accessed;

means for storing in the second ordered sequence in the data memory selected nyblets of words in channels operating at transmission rates less than the maximum data transmission rate, and a plurality of $n-1$ any other nyblets, where n is a quotient of the maximum transmission rate divided by a lowest transmission rate of the channels, for the incoming channels operating at transmission rates less than the maximum transmission rate, means for retrieving from the data memory the nyblets and transmitting the nyblets in a third ordered sequence, the third ordered sequence including only each selected nyblet.

* * * * *